(12) United States Patent
LaCoste

(10) Patent No.: US 6,206,295 B1
(45) Date of Patent: Mar. 27, 2001

(54) COMFORT THERMOSTAT

(76) Inventor: Marvin LaCoste, P.O. Box 292, Kiln, MS (US) 39556

( * ) Notice: Subject to any disclaimer, the term of this patent is extended or adjusted under 35 U.S.C. 154(b) by 0 days.

(21) Appl. No.: 09/262,375

(22) Filed: Mar. 4, 1999

Related U.S. Application Data

(60) Provisional application No. 60/076,938, filed on Mar. 4, 1998.

(51) Int. Cl.$^7$ ............................ G05D 23/00; H01H 37/12
(52) U.S. Cl. ......................... 236/94; 165/11.1; 337/360
(58) Field of Search ................................. 165/11.1, 265; 236/94; 337/360

(56) References Cited

U.S. PATENT DOCUMENTS

| | | | |
|---|---|---|---|
| 4,177,860 | * 12/1979 | Johnson et al. | 165/265 |
| 4,898,230 | * 2/1990 | Tsuchiyama et al. | 236/94 X |
| 5,550,524 | * 8/1996 | Zimmerman . | |

* cited by examiner

Primary Examiner—William Wayner
(74) Attorney, Agent, or Firm—Garvey, Smith, Nehrbass & Doody, LLC

(57) ABSTRACT

A "designer" thermostat also known as the "comfort-stat" which is mountable on the wall or the like having a first temperature range bar extending from a low point of 70 to a high point of 78, appearing in red, and a second temperature range bar extending from a high point of 78 to a low point of 70, appearing in blue. There would further be included a heat/cool button, and an on/auto/fan button, so that for example, when the thermostat is set on cool, the movable indicator would move along the blue bar between 70 and 78 with a digital read out of the temperature of the room on the face of the comfort stat, and when the thermostat is set on heat, the movable indicator would be set on the read bar between 70 and 78 with a digital read out of the temperature of the room. There would further be provided a mounting means for mounting the comfort stat on the wall with a void space between the thermostat for housing of the control wires between the rear face of the thermostat and the wall.

4 Claims, 2 Drawing Sheets

COMFORT THERMOSTAT

CROSS-REFERENCE TO RELATED APPLICATIONS

This application claims the benefit of U.S. provisional patent application Ser. No. 60/076,938, filed Mar. 4, 1998, incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to thermostats. More particularly, the present invention relates to a thermostat which is mountable on the wall and which includes a reduced temperature range which is easier to operate, saves the compressor and visually more appealing to the eye of the user.

2. General Background of the Invention

In current usage of thermostats, thermostats generally range between temperatures which for the most part are unrealistic. For example, a thermostat may range from a low of 50 up to a high of 90 on a thermostat setting. However, in the vast majority, if not all uses of the thermostat, the range is usually somewhere between 70 and 80 degrees in order to maintain comfort in the home or office. Therefore, when a person would drop the thermostat below 70 and leave it running and leave the home or office, then it may get to the point that the heating or air conditioning unit continues to operate and ice may collect on the evaporator. As this ice becomes thicker and thicker, liquid is being sent back to the compressor and burns the compressor out. Therefore, rather than have the thermostat read to very high or very low readings, which may create damage to the system, there is a need in the art for a thermostat that operates within a realistic and safe range of temperatures.

BRIEF SUMMARY OF THE INVENTION

The apparatus of the present invention solves the problems in the art in a simple and straight forward manner. What is provided is a "designer" thermostat also known as the "comfort-stat" which is mountable on the wall or the like, having a first temperature range bar extending from a low point of 70 to a high point of 78, appearing in red, and a second temperature range bar extending from a high point of 78 to a low point of 70, appearing in blue. There would further be included a first heat/cool button, a second on/auto/fan button, so that for example, when the thermostat is set on cool, the movable indicator would move along the blue bar between 70 and 78 with a digital read out of the temperature of the room on the face of the comfort stat, and when the thermostat is set on heat, the movable indicator would be set on the read bar between 70 and 78 with a digital read out of the temperature of the room. There would further be provided a mounting means for mounting the comfort stat on the wall with a void space between the thermostat for housing of the control wires between the rear face of the thermostat and the wall.

Therefore, it is a principal object of the present invention to provide a designer thermostat which ranges only between the ranges of 70 ad 78 degrees fahrenheit for most users in home and office;

It is a further object of the present invention to provide a designer thermostat which has an easily readable temperature range bars for moving an indicator between 70 and 78 degrees so that the user can use it within the principal ranges needed;

It is a further object of the present invention to provide a designer thermostat which eliminates all the small increments of temperature ranges, and where the only number showing is a digital readout of the temperature at that particular time;

It is a principal object of the present invention to provide an improved thermostat which would prevent evaporator freeze-up by allowing only the range in the thermostat between 70 and 78 degrees;

It is a further object of the present invention to provide an improved thermostat mountable on the wall which provides a storage space for excess gauge wires between the rear of the thermostat and the wall that it is mounted;

It is a further object of the present invention to provide a one-piece thermostat which is mountable on the wall which eliminates the separate sub bases, temperature control section, and allows a simple mounting on the wall by four screws in place.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
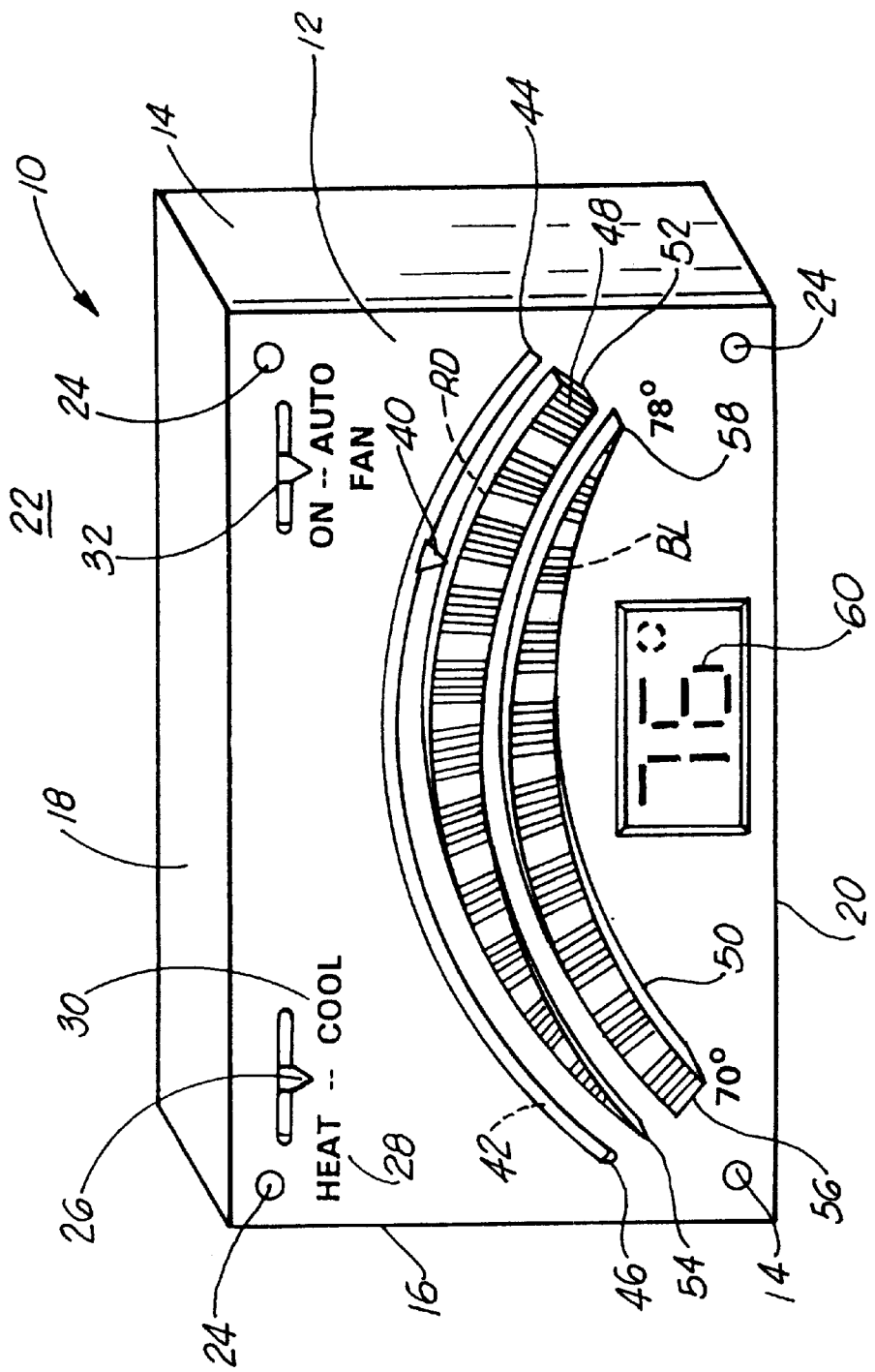
FIG. 1 illustrates an overall front view of the preferred embodiment of the apparatus of the present invention.

As illustrated in FIG. 1, there is illustrated the designer comfort stat apparatus 10. As indicated, the designer stat apparatus 10 includes a front face portion 12, a pair of side walls 14, 16, an upper wall 18, a lower wall 20, with the stat 10 mountable against a wall 22 via four mounting screws 24, preferably at each corner of the forward face 12 of the apparatus 10. As further illustrated, there is a indicator lever 26 on the face 12 of the apparatus movable between a first position of heat 28 or a second position of cool 30. On the opposite corner there is a second lever 32 movable between the positions of on, fan, or auto. Both levers 26 and 32 would be movable manually by the operator.

Figure 2:
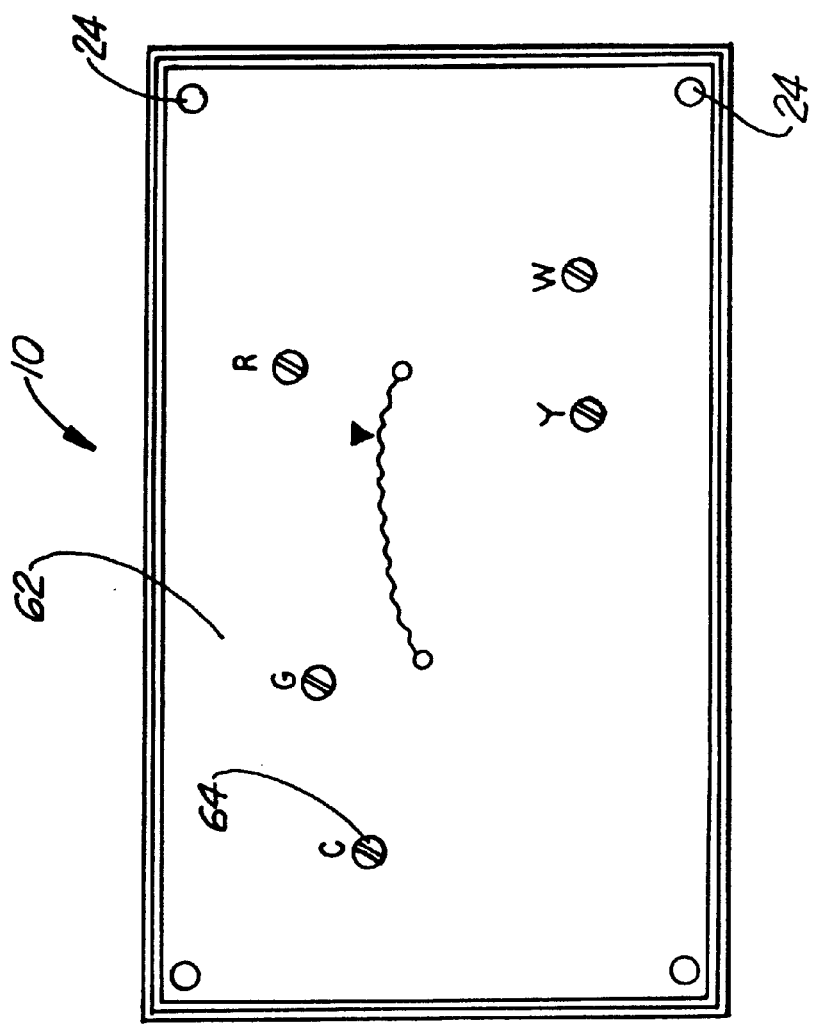
FIG. 2 illustrates a rear view thereof.

Further, the apparatus includes a third movable lever 40 which is movable along an elongated arcuate slot 42. The lever 40 is movable from the first end 44 to the second end 46 of slot 42. The movability of lever 40 would be according to the temperature range as indicated by the upper red band 48 or the lower blue band 50. Red band 48 would range from a high end 52 with a temperature range of 78 degrees, to the low end 54, with the low range of 70 degrees. Likewise, lower blue band 50 would range from the low end 56 of 70 degrees to the high end 58 of 78 degrees. Therefore, in operation, the user would place the lever 26 for example, on cool 30 and place the lever 32 on, for example, "auto". The lever 40 would then be moved along slot 42 between the ranges of 70 and 78, as seen on the blue band, and the point at which the lever 40 is stopped, for example, as seen in FIG. 1, would indicate that the temperature at that point is 76 degrees as seen in window 60. The importance of that is that the upper band "red" 48 is a band which indicates the heat band, and the lower "blue" band 50 indicates the cool band in the operation of the thermostat. As clearly noted, there is no ranges lower than 70 or higher than 78 for either the cool band 50 or the heat band 48 which makes it a very compact range temperatures. Therefore, the unit 10 can be used in the average office or home which very seldom would go beyond those ranges, and in doing so, would eliminate any problem with freeze up or damage to the compressor. As seen, FIG. 2 simply illustrates a rear face 62 of the apparatus 10. There is a plurality of connections 64 labeled C, G, R, Y, and W, which are simply wire control connections 64 in the connection of the apparatus to the heating and cooling systems. As seen also, there are the four ports 24 where the mounting screws would be therethrough for mounting.

Figure 3:
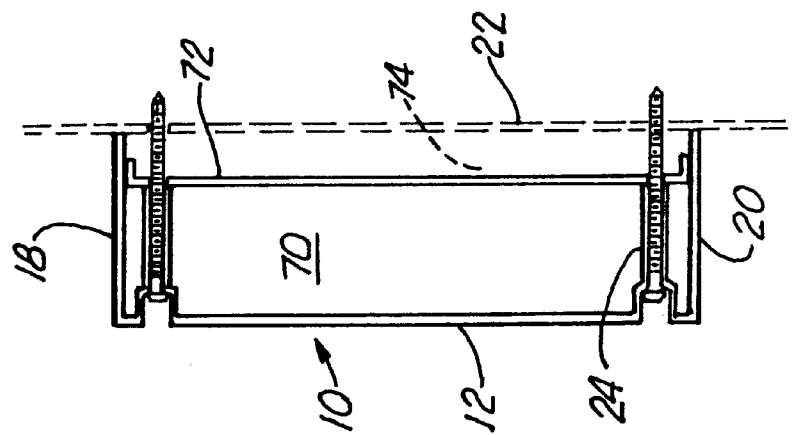
FIG. 3 illustrates a cross section side view thereof.

As seen in FIG. 3 in side view, the apparatus 10 shows the face 12 and the upper wall 18 and lower wall 20 with the mounting screws 24 threaded into the wall 22. As seen in this position, the mechanism for the apparatus 10 would be found within space 70, and there would be a rear recess wall 72 so that there is a void space 74 defined between the wall 72 of the apparatus 10 and the wall 22 of the building. In the void space 74 would be where any kind of excess control wires or the like would be housed so that the apparatus may be mounted as a one-piece apparatus directly against the wall 22 as indicated in FIG. 3.

The foregoing embodiments are presented by way of example only; the scope of the present invention is to be limited only by the following claims.

What is claimed is:

1. An improved thermostat, comprising:
   a. a housing, having a first face, four side walls, the housing mountable against an upright surface, such as a wall;
   b. the face of the housing further comprising a temperature lever, extendable across a portion of the thermostat face between temperature ranges of 70 and 80 degrees Fahrenheit;
   c. a cool band and a heat band on the face of the housing so that when the heating or cooling system is in operation, the cooling system temperature would be set according to a blue band, and the heating system temperature would be set according to a red band; and
   d. means for indicating temperature as a digital readout.

2. The thermostat in claim 1, further comprising a recessed area between a rear wall of the thermostat and the upright surface for housing excess wiring extending from the wall.

3. The thermostat in claim 1, wherein the means for indicating temperature would be positioned on the face of the thermostat as a the digital readout.

4. An improved thermostat, comprising:
   a. a housing, having a first face, four side walls, the housing mountable against an upright surface, such as a wall;
   b. the face of the housing further comprising a temperature lever, extendable across a portion of the thermostat face between temperature ranges no less that 70 and no greater than 80 degrees fahrenheit;
   c. a cool band and a heat band on the face of the housing so that when the heating or cooling system is in operation, the cooling system temperature would be set according to a blue band, and the heating system temperature would be set according to a red band;
   d. a recessed area between a rear wall of the thermostat and the upright surface for housing excess wiring extending from the wall; and
   e. means for indicating temperature as a digital readout.

\* \* \* \* \*